C. J. FENSOM.
FRICTION CLUTCH.
APPLICATION FILED FEB. 15, 1909.

975,846.

Patented Nov. 15, 1910.

Witnesses
H. Dennison
Wm C. Muir

Inventor
C. J. Fensom
by E. J. Fetherstonhaugh
Atty.

UNITED STATES PATENT OFFICE.

CHARLES JOSEPH FENSOM, OF TORONTO, ONTARIO, CANADA.

FRICTION-CLUTCH.

975,846.

Specification of Letters Patent.   Patented Nov. 15, 1910.

Application filed February 15, 1909.  Serial No. 478,024.

*To all whom it may concern:*

Be it known that I, CHARLES JOSEPH FENSOM, a subject of the King of Great Britain, and resident of the city of Toronto, county of York, Province of Ontario, in the Dominion of Canada, have invented certain new and useful Improvements in Friction-Clutches, of which the following is a specification.

The invention relates to improvements in friction clutches, as described in the following specification and illustrated in the accompanying drawings that form part of the same.

The invention consists essentially in the novel construction and arrangement of parts, whereby the pressure on the friction surfaces is automatically relieved in the event of an undue increase in torque, by the separation of the friction surfaces actuated by means employed for effecting a change in the relative positions of two of the driving members of the clutch.

The objects of the invention are, to devise a particularly efficient clutch for use in operating swing bridges, canal lock gates and other devices where a heavy body is set in motion and where it is practically impossible to stop the driving mechanism simultaneously with the stopping of the bridge or gate, thus saving a considerable strain on the said driving mechanism, to construct a simple and durable machine, and generally to provide a mechanism which will readily lend itself to various modifications for different uses.

Figures 1, 2:
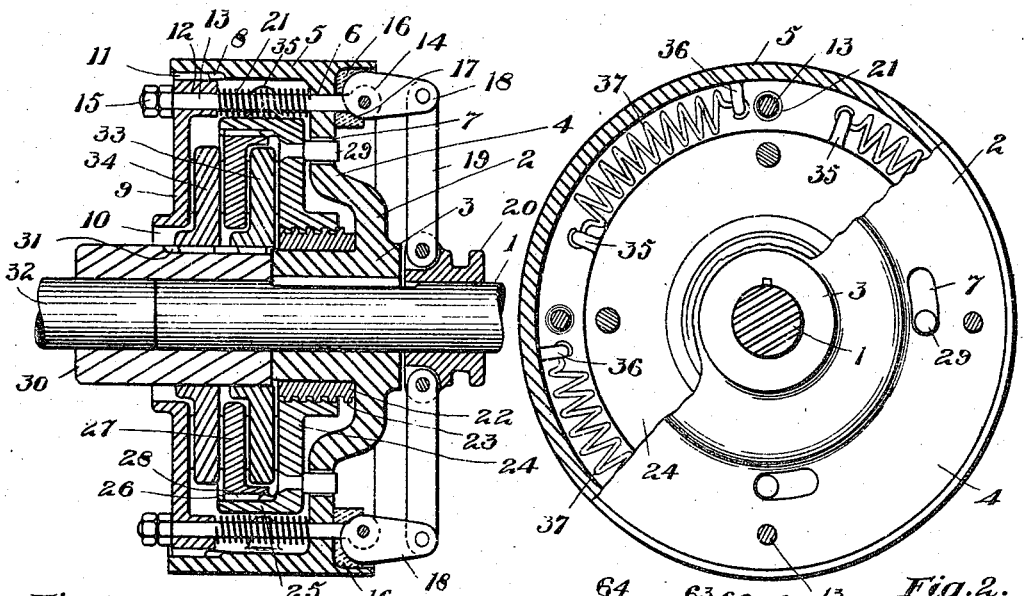
Figures 3, 4:
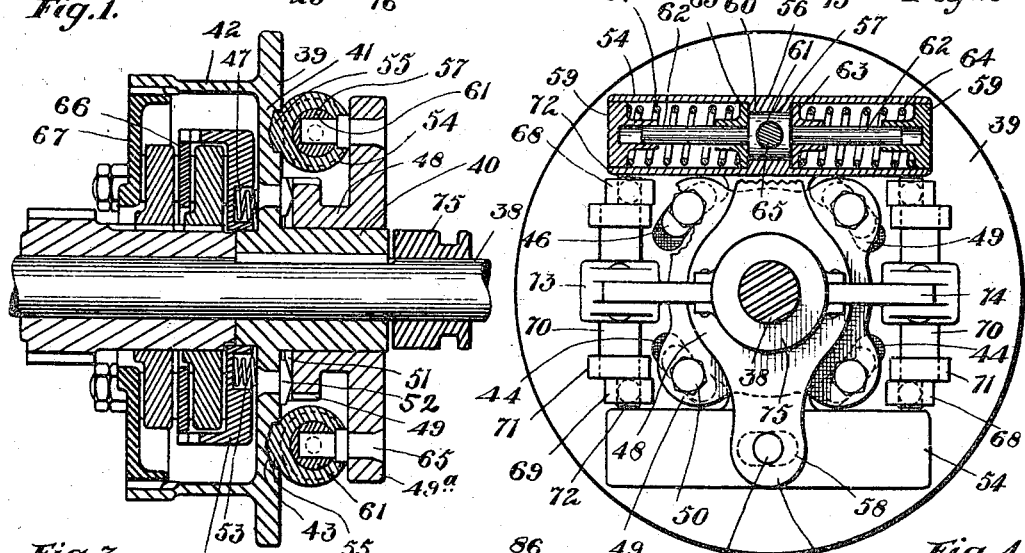
Figures 5, 6, 7:
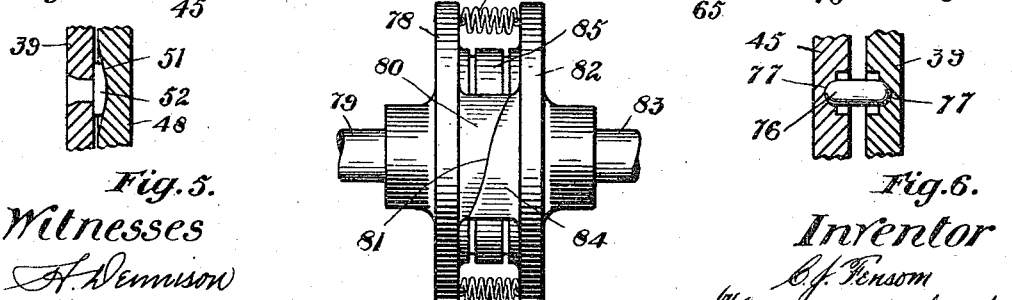

In the drawings, Figure 1 is a vertical sectional view through a form of clutch used for driving in one direction only. Fig. 2 is an end view of the clutch shown in Fig. 1, showing the main driving member partly broken away. Fig. 3 is a vertical sectional view through a form of clutch adapted to operate in either direction. Fig. 4 is an end view partly in section, of the clutch shown in Fig. 3. Fig. 5 is a small sectional detail showing the means for separating the friction surfaces of the clutch shown in Fig. 3. Fig. 6 is a small sectional detail of a modified means for separating the friction surfaces. Fig. 7 is a plan view of a further modified form of clutch.

Like numerals of reference indicate corresponding parts in each figure.

Referring to the drawings, 1 is the main shaft. 2 is a clutch member having a hub 3 mounted on and keyed to said shaft and a web 4 and a rim or flange 5 concentric with said hub, said web having bolt holes 6 arranged diametrically opposite one to the other and short concentric slots 7 also diametrically arranged, and said flange having the key-ways 8 cut in the inner wall and extending inwardly from the outer edge.

9 is a friction disk fitting within the inner periphery of the flange 5 having a central circular opening 10 therethrough and the feathers 11 sliding in the key-ways 8 in said flange and bolt holes 12 arranged in alinement with the bolt holes 6 in the clutch member 2.

13 are bolts extending through the bolt holes 6 and 12 in the member 2 and disk 9 and securing said disk to said member 2, said bolts having the eye-shaped heads 14 at one end and the nuts 15 on the opposite threaded end.

16 are blocks encircling the bolts 13 between the heads 14 and the member 2 and having eccentrically arranged recesses 17 in their outer faces.

18 and 19 are toggles of a toggle joint set substantially at right angles having the members 18 eccentrically pivoted to the eye heads of the bolts 13 and the member 19 pivotally secured to a sleeve 20, the latter encircling the shaft 1 and slidably arranged on said shaft, said sleeve being suitably operated to throw the clutch into and out of gear.

21 are spiral springs encircling the bolts 13 and holding the disk 9 to its outermost position.

22 is a sleeve fixedly secured to the inner end of the hub 3 of the member 2 and having a suitable screw thread 23 formed on its periphery said thread being preferably of a very steep incline.

24 is a disk having a central threaded orifice corresponding with and turning on the sleeve 22 and a concentric rim or flange 25, said flange 25 having the key-ways 26 cut in its inner wall and extending inwardly from the outer edge.

27 is a loose friction ring supported by the flange of the disk 24 and having the feathers 28 sliding in said key-ways.

29 are pins fixedly secured in the disk 24 extending outwardly and into the slots 7 in the member 2, said pins engaging the ends of said slots to limit the rotation of the disk 24 in relation to the main driving member.

30 is a sleeve rotatable on the end of the shaft 1 and having a key-way 31 longitudinally arranged in the periphery.

32 is the driven shaft fixedly secured in the sleeve 30.

33 and 34 are friction disks slidably arranged on the sleeve 30 and having suitable feathers extending into the key-way 31.

The disks 33 and 34 are arranged between the disk 24 and the ring 27 and between the ring 27 and disk 9 respectively and are provided with suitable friction surfaces to engage the faces of the aforesaid disks and ring.

35 are lugs projecting outwardly from the flange of the disk 24 and having orifices through the center thereof.

36 are lugs projecting inwardly from the inner wall of the flange 5 of the main clutch member 2 and arranged in circumferential alinement with the lugs 35.

37 are spiral tension springs having one end secured in the lugs 35 and the other end secured in the lugs 36. The said lugs and springs are arranged between the bolts 13, so as not to interfere therewith. The springs 37 are of sufficient strength to transmit a certain predetermined torque from the main driving member 2 to the disk 24, and normally hold said disk so that the pins 29 engage one end of the slots 7. It will therefore be seen that when the sleeve 20 is in its inward position and the bolts 13 are drawn tight by the toggle levers 18 and 19, the disks 33 and 34 will be clamped securely between the disks 9 and 24 and the ring 27, and the shaft 32 is driven from the shaft 1 through the medium of the springs 37 and disk 9.

In the event of the torque exceeding that allowed by the strength of the springs 37, the said springs will yield and allow the main driving member 2 to move slightly in advance of the disk 24 thus turning the threaded sleeve 22 within the threaded portion of the disk 24 and consequently drawing the said disk 24 toward the said main driving member. The lateral movement of the disk 24 immediately relieves the pressure on the friction surfaces and allows them to slip slightly or quite freely according to the manner in which the driven parts are retarded. As soon as the excessive torque, caused by the inertia of a heavy body to be moved or by a sudden stoppage or retention of the driven parts, is relieved, the springs 37 automatically return the disk 24 to its normal position. It will of course be understood that the strength of springs used will be governed by the required maximum transmission.

Tension springs are shown but it must be understood that the springs may be arranged in compression so that the disk 24 is pushed instead of being pulled as shown.

In the form of clutch shown in Figs. 3 and 4, 38 is the driving shaft. 39 is the driving clutch member having a hub 40 keyed to the shaft 38 and a web 41 and a rim or flange 42 concentric with the hub, said web having suitable bolt holes therethrough and a pair of circular recesses 43 arranged diametrically opposite one to the other and a plurality of short concentric slots 44 therethrough, said flange having suitable key-ways cut in its inner wall at the outer edge thereof. 45 is a friction disk journaled on the inwardly projecting end of the hub 40 of the member 39 and having the lugs 46 extending through the slots 44 in the said member 39 and a plurality of recesses 47 in the face adjacent to the inner face of the member 39. 48 is a ring encircling the outer projecting end of the hub 40 of the member 39 and having the lugs 49 abutting the ends of the lugs 46 of the disk 45 and the radial arms 49ª, said ring being rigidly secured to the disk 45 by the cap screws 50 extending through the lugs 49 and into the lugs 46. 51 are broad V-shaped grooves radially arranged in the face of the ring 48 adjacent to the outer face of the web of the member 39. 52 are studs rigidly secured in the member 39 and having broad conical shaped heads engaging the inclined faces of the grooves 51. 53 are spiral compression springs ensconced within the recesses 47 in the friction disk 45, said springs contacting with the inner face of the member 39, and holding said friction disk therefrom and consequently holding the ring 48 with the inclined faces of its radial grooves in contact with the heads of the studs 52. 54 are cylindrical casings having the teats 55 projecting from the center thereof and journaled in the recesses 43 in the outer face of the member 39, said casings having a central partition wall 56 and a circular longitudinal orifice 57 therethrough and the longitudinal slots 58 arranged diametrically opposite said teats. 59 are caps closing the ends of the casings 54 and having the central circular recesses in the inner ends. 60 are cylindrical blocks slidably arranged in the orifices 57 and having an orifice 61 in the side thereof registering with the slots 58. 62 are guide rods fixedly secured in the ends of the blocks 60 and extending into the recesses in the end caps 59. 63 are washers encircling the rods 62 and abutting the ends of the cylindrical blocks 60. 64 are spiral compression springs inclosed with the casings 54 at each end and exerting an end pressure against the washers 63 and holding the cylindrical blocks 60 in a central position. 65 are pins fixedly secured in the arms 49ᵃ projecting from the ring 48, said pins extending through the slots 58 in the casings 54 and into the orifices 61 in the blocks 60. It will be seen from this description that the friction disk 45 is rotatively connected to the main driving member 39 through the ring 48, springs 64 and casings 54 and as said casings are pivotally supported from the said main driving member they will swing on their pivots and allow the ring 48 to turn on the hub of the main driving member, thus the members engaging the friction surfaces of the driving members of the clutch are driven mainly through the medium of the springs 64 and in the event of an undue increase in torque, said springs will yield and allow the main driving member to move slightly in advance of the ring 48. In the event of the main driving member moving in advance of the ring 48 in either direction, the sloping faces of the radial grooves in the said ring, engaging the correspondingly inclined faces of the studs 52, cause the said ring to move outwardly from said main driving member and as the said ring is rigidly connected to the disk 45 said disk is drawn toward the said main driving member, thus relieving the pressure between the remaining members of the clutch and allowing them to slip. In this form of clutch the floating ring 66 is slightly different from the ring 27 in the construction shown in Figs. 1 and 2 and this difference is in forming a plurality of radial fingers on the outer periphery of the ring extending into a plurality of notches in the outer edge of the rim of said ring. 67 is the outer friction disk supported in the rim of the member 39 and non-rotatively held by suitable feathers sliding in the key-ways cut in said rim. 68 are bolts extending through the member 39 and to and through the disk 67, said bolts having nuts on the outer threaded ends and heads 69. 70 are crank shafts supported in the bearings 71 extending outwardly from the main driving member 39, said crank shafts having the crank pins 72 pivotally secured in the heads of the bolts 68. 73 are arms rigidly secured to the crank shafts 70. 74 are links connecting the said arms 73 with the sleeve 75 slidably arranged on the main driving shaft, said sleeve being operated in any suitable manner.

In the form of clutch shown in Figs. 3 and 4 the springs 53 not only serve to hold the ring 48 in engagement with the ends of the studs 52 but also hold the friction faces in resilient contact, thus obviating any binding between said faces in the event of uneven wear, that is to say, the springs 53 being interposed between the disk 45 and the driving member 39, hold the said disk so that it will yield slightly and relieve any tendency to bind, in the event of any of the friction disks becoming worn unevenly or any foreign matter getting between the friction faces.

In Fig. 6, 76 are loose pins having rounded ends resting in the cup-shaped recesses 77 and under normal conditions, that is to say, when the clutch is operating at less than the maximum torque, the said pins remain in vertical relation to said disks. The pins 76 may be used in place of the springs 53. In the event of the torque increasing so as to cause a compression of the springs 64, thus changing the relative position of the main driving member and main friction disk, the pins 76 will swing to a sloping position, consequently allowing the friction disk to move closer to the main driving member and therefore easing the pressure on the friction surfaces.

Referring to Fig. 7, 78 is a disk fixedly secured to the driving shaft 79 and having the lugs 80 extending laterally therefrom and arranged diametrically opposite one to the other, said lugs having the spiral faces 81. 82 is a disk similar to the disk 78 loosely journaled on the driven shaft 83 and having the lugs 84 corresponding with the lugs 80 on the disk 78 and formed with the opposite incline or spiral. 85 is a friction disk fixedly secured to the driven shaft 83 and arranged between the disks 82 and 78. 86 are spiral tension springs secured to the disks 78 and 82 and drawing them together and holding them in contact with the friction disk 85 and consequently rotating the driven shaft. In the event of the torque increasing beyond that desired for transmission, the incline faces of the lugs 80 and 84 will slip slightly on the stretching of the springs, consequently the friction faces separate releasing the driven disk. This form of the device is more of a safety brake or coupling, but it embodies the same general features as the former forms of the device.

Many other forms of clutches, brakes, or couplings may be devised utilizing the essential feature of the invention, that is to say, the temporary relief of the friction surfaces caused through a change in the relative position of two of the driving members of the clutch may be adapted to many different constructions.

The essential feature of the invention may be applied to the form of clutch known as a band clutch very readily, it being only necessary to accommodate the construction of details to accomplish an expanding or contracting movement instead of a lateral movement as herein described. Further it is possible to operate the clutch in the form of a safety brake, the release actuating in conjunction with the well known principle of "centrifugal governors" whereby the outward movement of weighted members caused by the speed of rotation will operate to change the relative position of the two driving members of the clutch.

What I claim as my invention is:—

1. In a friction clutch, a main driving member having inclined surfaces, a member loosely mounted and rotating with said main driving member and having inclined surfaces engaging the inclined surfaces of the aforesaid member, springs connecting the said loose member to said main driving member, rotatable friction members arranged adjacent to the aforesaid members, and means for bringing said friction members into engagement with the aforesaid members under pressure.

2. In a friction clutch, a main driving member having inclined surfaces projecting from one of its faces and a lateral flange or rim, a friction disk slidably supported from said rim, bolts extending through said main driving member and said friction disk, means for drawing on said bolts to draw said friction disk toward said main driving member, a friction member loosely mounted adjacent to said main driving member and having inclined surfaces engaging the inclined surfaces of said main driving member, springs connected to said friction member and to said main driving member, and a friction disk having suitable friction faces supported between said friction member and said slidable friction disk and clamped therebetween.

3. In a friction clutch, a main driving member having inclined surfaces projecting from one of its faces and a lateral flange or rim, a friction disk slidably supported from said rim, bolts extending through said main driving member and said friction disk, toggle levers connected to said bolts, means for operating said toggle levers, a friction member loosely mounted adjacent to said main driving member and having inclined surfaces engaging the inclined surfaces of said main driving member, springs connected to said friction member and to said main driving member, and a friction disk having suitable friction faces supported between said friction member and said slidable friction disk and clamped therebetween.

4. In a friction clutch, the combination with a shaft, of a main driving member fixedly secured to said shaft having inclined surfaces projecting from one of its faces and a lateral flange or rim, a friction disk slidably supported from said rim, bolts extending through said main driving member and said friction disk, crank shafts journaled in suitable bearings supported from said main driving member, said crank shafts having crank pins pivotally secured to said bolts, a sleeve slidably supported on said shaft, toggle levers connected to said crank shafts and to said sleeve, a friction member loosely mounted adjacent to said main driving member and having inclined surfaces engaging the inclined surfaces of said main driving member, springs connected to said friction member and to said main driving member, and a friction disk having suitable friction faces supported between said friction member and said slidable friction disk and clamped therebetween.

5. In a friction clutch, a main driving member having inclined surfaces projecting from one of its faces and a lateral flange or rim, a friction disk slidably supported from said rim, means for drawing said friction disk toward said main driving member, a friction member loosely mounted adjacent to said main driving member and having inclined surfaces engaging the inclined surfaces of said main driving member, a friction disk supported between the aforesaid friction disk and said friction member, a ring loosely mounted on said main driving member and rigidly secured to said friction member, said ring having an arm extending radially therefrom, a cylindrical casing pivotally supported from said main driving member, said casing having caps closing the ends and a longitudinal slot in the side wall, a reciprocatory member centrally arranged in said casing, springs inclosed within said casing and abutting each end of said reciprocatory member and the closed ends of said casing, and a pin secured to and extending laterally from the radial arm of said ring through the longitudinal slot in said casing and connected to said reciprocatory member.

6. In a friction clutch, a shaft, a main driving member fixedly secured to said shaft and having concentric slots through the web portion thereof and a lateral flange or rim said rim having suitable key-ways therein, a friction disk supported from said flange and having feathers sliding in said keyways, a friction member having a lateral flange or rim and lugs projecting therefrom extending through slots in said main driving member, and recesses in the face adjoining said main driving member, a ring loosely mounted on the hub of said main driving member and rigidly secured to the projecting lugs from said friction member and having radial grooves in the inner face thereof, said radial grooves having inclined faces and diametrically arranged arms extending from the outer end thereof, studs fixedly secured in said main driving member having inclined faces engaging the inclined faces of said radial grooves, springs inserted in the recesses in said friction member and holding the said studs in engagement with the faces of said grooves, springs supported from said main driving member and connected to the radial arms of said loose ring, a floating friction disk non-rotatively supported from the rim of said friction member, a sleeve loosely mounted on said shaft, a pair of friction disks slidably arranged on said sleeve and supported between said friction member and the aforesaid friction disks, and means for clamping said friction disks to said friction member.

7. In a friction clutch, a shaft, a main driving member rotating with said shaft, a rotating member loosely mounted adjacent to said main driving member and rotating therewith, friction members adapted to coact with said loosely mounted member, means for holding said main driving member and loosely mounted member apart and said loosely mounted member in operating contact with said friction members, said holding means being adapted on an undue increase in torque to allow said loosely mounted member to move toward said driving member and release the friction members, and means for drawing said loosely mounted member toward said main driving member.

8. In a friction clutch, a main driving member having an inclined plane, a member rotatable with said main driving member and having an inclined plane engaging the inclined plane of said main driving member, a friction member normally engaging said rotatable member, and a resilient member located between said main driving member and said rotatable member and adapted to yield on an undue increase in torque to allow a change in the relative positions of the inclined planes and a consequent change in the relative positions of the said main driving member and said rotatable member, said change effecting the release of the said friction member.

Signed at the city of Toronto, county of York, Province of Ontario, in the Dominion of Canada, this 9th day of February, 1909.

CHARLES JOSEPH FENSOM.

Witnesses:
   H. DENNISON,
   E. HERON.